United States Patent
Ogasawara

(10) Patent No.: US 8,570,308 B2
(45) Date of Patent: *Oct. 29, 2013

(54) GRAPHIC METER DISPLAY

(75) Inventor: Kazuyoshi Ogasawara, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 1241 days.

This patent is subject to a terminal disclaimer.

(21) Appl. No.: 11/790,137

(22) Filed: Apr. 24, 2007

(65) Prior Publication Data

US 2007/0285388 A1    Dec. 13, 2007

(30) Foreign Application Priority Data

May 17, 2006  (JP) .................................. 2006-137361

(51) Int. Cl.
*G06F 3/038* (2013.01)

(52) U.S. Cl.
USPC ............ 345/204; 345/157; 345/1.1; 345/690; 340/461

(58) Field of Classification Search
USPC ............. 345/204, 157, 58, 1.1; 348/607, 416, 348/439, 699, 424, 419, 425, 426, 700, 690
See application file for complete search history.

(56) References Cited

U.S. PATENT DOCUMENTS

| | | | | |
|---|---|---|---|---|
| 5,982,440 | A * | 11/1999 | Aoki | 375/240.16 |
| 7,506,267 | B2 | 3/2009 | Baxter et al. | 715/781 |
| 2004/0075749 | A1 * | 4/2004 | Kondo et al. | 348/222.1 |
| 2004/0150619 | A1 * | 8/2004 | Baudisch et al. | 345/157 |
| 2005/0212669 | A1 * | 9/2005 | Ono et al. | 340/461 |
| 2005/0280521 | A1 * | 12/2005 | Mizumaki | 340/438 |
| 2005/0285815 | A1 * | 12/2005 | Tryhub et al. | 345/58 |

FOREIGN PATENT DOCUMENTS

| | | |
|---|---|---|
| DE | 195 30 419 | 2/1997 |
| DE | 101 28 871 | 12/2002 |
| EP | 1 391 846 | 2/2004 |
| JP | 2002-15335 | 1/2002 |
| JP | 2003-233828 | 8/2003 |
| JP | 2003-262542 | 9/2003 |

OTHER PUBLICATIONS

Communication from German Patent Office mailed May 14, 2009 (6 pages).

* cited by examiner

*Primary Examiner* — Lun-Yi Lao
*Assistant Examiner* — Olga Merkoulova
(74) *Attorney, Agent, or Firm* — Kratz, Quintos & Hanson, LLP

(57) ABSTRACT

A trapezoid-shaped motion blur pointer image is composed of edges of normal pointer images. The normal pointer image and the motion blur pointer image are not overlapped with each other to prevent unevenness in brightness. The brightness of the motion blur pointer image is even in a whole area of the motion blur pointer image. The brightness of the motion blur pointer image has an inverted relationship with an area thereof, or is varied corresponding to a rotation speed of the pointer image.

6 Claims, 6 Drawing Sheets

GRAPHIC METER DISPLAY

CROSS REFERENCE TO RELATED APPLICATIONS

This application is on the basis of Japanese Patent Application No. 2006-137361, the contents of which are hereby incorporated by reference.

BACKGROUND OF THE INVENTION

1. Field of the Invention

The present invention relates to a graphic meter display for a vehicle for displaying driving data by graphically displaying a dial plate and a pointer using such as a dot matrix type LCD.

2. Description of the Related Art

Japanese Published Patent Application No. 2003-262542 discloses one of a conventional graphic meter display. When the pointer on the graphic meter display is moved rapidly, many pointer images are shown as after-images. Therefore, an object of this graphic meter display is to solve the problem, and prevents a viewer from feeling a sense of incompatibility. For solving the problem, the graphic meter display displays a shadow opposed to a moving side of the pointer when a moving speed of the pointer is over a predetermined value.

Such a display technique is called a "motion blur" technique for displaying a rapidly moving object by canceling after-images, and disclosed in Japanese Published Patent Application No. 2002-15335 and No. 2003-233828.

In the graphic meter display, when a normal pointer image is displayed, the normal pointer image as a fixed pattern is drawn after determining a rotational position of the pointer image. Therefore, an image processing load is small. The motion blur pointer image is suitable for displaying a rapidly moving pointer, however, the image processing load of the motion blur pointer image is generally larger than that of the normal pointer image. Therefore, it is necessary to devise the image processing to decrease the load.

For example, as shown in FIG. 6A, when the pointer image is rotated from a pointer image a at a last frame timing to a pointer image b at a present frame timing, because the pointers a, b are rotated about the same center axis, a sector-shaped motion blur image generated by sweeping from the pointer image a to the pointer image b can be used for a realistic expression as shown in FIGS. 6A and 6B. Further, in this case, as shown in FIG. 6B, gradation can be made to be gradually thinner toward a tip of the pointer. Further, as shown in FIG. 6C, gradation can be made to be gradually thicker as a rotation speed is higher. Further, as shown in FIG. 6D, a plurality of pointer images can be overlapped with each other from the pointer image a to the pointer image b.

However, in a case of the sector-shaped motion blur pointer image as shown in FIGS. 6A and 6B, there is a problem that the image processing load for calculating a sector figure increases. Further, when making gradation, the load increases. Further, as shown in FIG. 6D, when the many pointer images are drawn, the load increases.

On the contrary, an inventor of the present invention found that because the motion blur image is a momentary display corresponding to a rapid rotation of the pointer, a realistic motion blur image is not necessary.

According to the above, an object of the present invention is to provide a graphic meter display to decrease an image processing load of displaying a motion blur image.

SUMMARY OF THE INVENTION

In order to attain the object, according to the present invention, there is provided a graphic meter display for displaying a rotating pointer on a graphic display screen by updating a frame at a specific timing, wherein when a rotation speed of the pointer to be displayed is more than a specific value, the display generates a motion blur pointer image composed of a trapezoid of which opposite sides are the pointer corresponding to a last frame and the pointer corresponding to a present frame, and displays the motion blur pointer image as an image in the present frame.

Preferably, the trapezoid of the motion blur pointer image is uniformly bright.

Preferably, brightness of the motion blur pointer image is changed depending on the rotation speed of the pointer.

Preferably, the brightness of the motion blur pointer image has an inverted relationship with an area of the motion blur pointer image.

Preferably, the brightness of the motion blur pointer image has a relationship with the rotation speed of the pointer.

Preferably, a drawing range of the motion blur pointer image in the present frame is not overlapped with the drawing range of the pointer image in the last frame.

These and other objects, features, and advantages of the present invention will become more apparent upon reading of the following detailed description along with the accompanied drawings.

DETAILED DESCRIPTION OF THE PREFERRED EMBODIMENTS

Next, an embodiment of a graphic meter display according to the present invention will be explained with reference to figures. In this embodiment, the graphic meter display is used in a meter for a vehicle.

Figure 1:
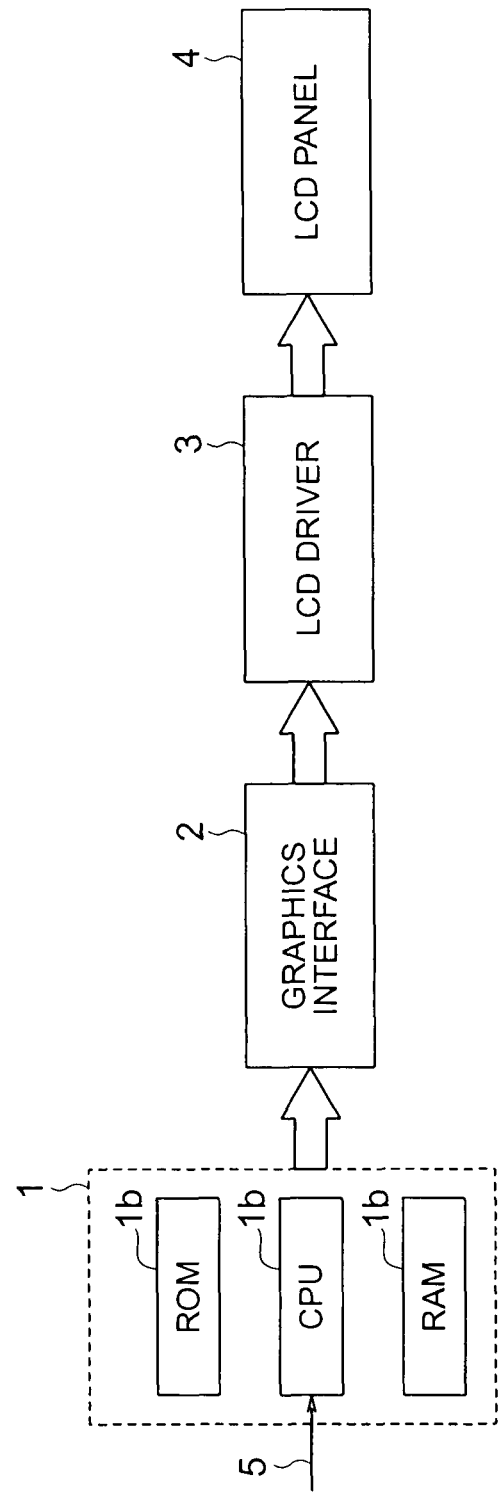
FIG. 1 is a system block diagram of a meter for a vehicle using an embodiment of a graphic meter display according to the present invention.

In FIG. 1, the meter of this embodiment is composed of a microcomputer 1, a graphic interface 2, an LCD driver 3, and an LCD panel as a graphic display. The microcomputer 1 includes a CPU 1a for executing various controls and processes according to a predetermined program, a ROM 1b storing such as the program for the CPU 1a, a RAM 1c for providing a working area for CPU 1a. The ROM 1b previously stores a still image of a substantially circular dial plate and a plurality of pointer images (normal pointer images) having position coordinates corresponding to rotation angles of a rotating pointer on the dial plate. The ROM 1b also stores a threshold value for comparing a rotation speed. Incidentally, the normal pointer image is displayed rotatably corresponding to a rotation angle.

The microcomputer 1 generates various images based on various detecting signal of the vehicle through a data bus 5, and sends the images to the LCD panel 4 via the graphic interface 2 and the LCD driver 3. Then, the microcomputer 1 displays images of a speedometer, a tachometer, a fuel mater, and the like. Incidentally, in the following explanations, a rotating meter for displaying engine revolutions will be explained.

A still image of a substantially circular dial plate is displayed on the LCD panel 4, and a moving image of a pointer rotating corresponding to the engine revolutions is displayed on a graduations of the dial plate. The dial plate is, for example, displayed as an image having white graduations and numbers with a black background, and the pointer (normal pointer image) is, for example, displayed as a red image. The pointer image is switched at every unit time (a specific timing) T0 (=1/60 (sec)) with a rotation value (angle) sampled at every unit time T0. Further, each screen at the unit time T0 is a frame. When the pointer image is displayed, a difference of the position coordinates (rotation speed of the pointer) is calculated based on an angular difference of the pointer between the latest and the last time rotation values, and the pointer image is selected or calculated based on the rotation speed of the pointer. Namely, when the rotation speed (amount of change) is less than a threshold value, a normal pointer image is selected, and when the rotation speed is equal to or more than the threshold value, the motion blur pointer image is obtained. Then, as shown in a flowchart of FIG. 2, the frame is switched at every unit time. This display is called "drawing" in the process of the CPU 1a.

Figure 2:
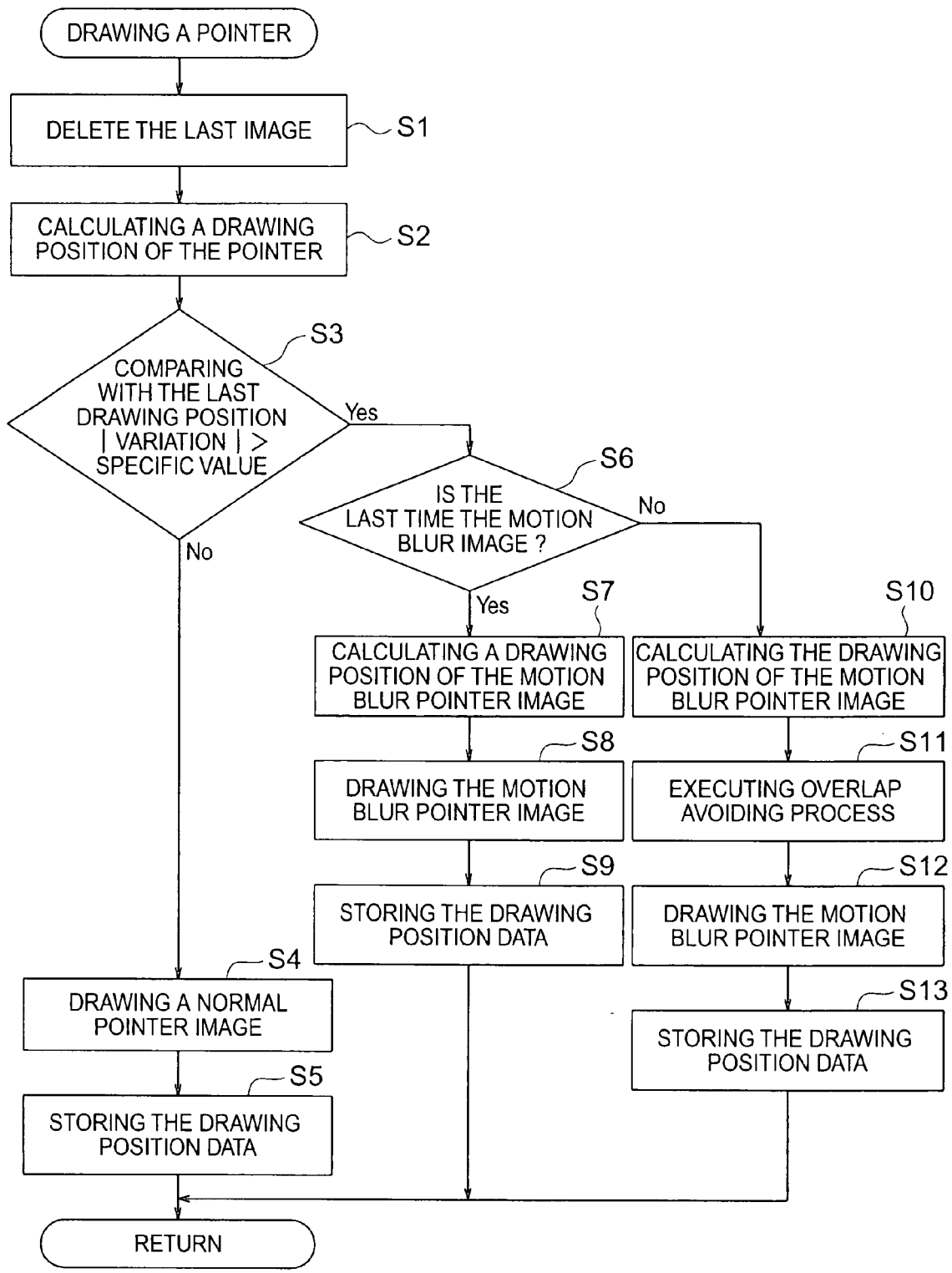
FIG. 2 is a flowchart explaining a display control process of the meter for a vehicle.

A flowchart of FIG. 2 is a pointer drawing process subroutine repeated at every frame. The process is executed by inputting a rotation value corresponding to a rotation speed of an engine at every unit time T0 using a main processing and a timer interrupt. First, the CPU 1a erases the last time drawing pointer image (normal, intermediate, or motion blur pointer image) at step S1, then calculates a drawing position of the latest pointer image at step S2. Next, at step S3, a variation is calculated based on a difference between the last time and the latest rotation values, and judges whether an absolute value of the variation is equal to or more than the threshold value. If the absolute value is equal to or less than the threshold value, the normal pointer image is drawn at step S4, then, the RAM 1c stores drawing position data of the normal pointer image (for example, coordinates of a tip end of the normal pointer image) at step S5, and then, the process returns to step S1.

When the absolute value is more than the threshold value at step S3, the CPU 1a judges whether the last time pointer image is the motion blur pointer image or not at step S6. If the last time pointer image is the motion blur pointer image, the CPU 1a calculates the drawing position (coordinates) of the motion blur pointer image at step S7. Then, at step S8, the motion blur pointer image is drawn. Then, at step S9, the drawing position data of the motion blur pointer image is stored in the RAM 1c, and the process returns to step S1.

If the last image is not the motion blur pointer image at step S6, the drawing position of the motion blur pointer image is obtained at step S10. Then, at step S11, a later-described overlap avoiding process for the obtained motion blur pointer image and the last normal pointer image is executed. Then, at step S12, the motion blur pointer image is drawn. Then, at step S13, the drawing position of the motion blur pointer image is stored in the RAM 1c, and the process returns to step S1.

Figure 3A:
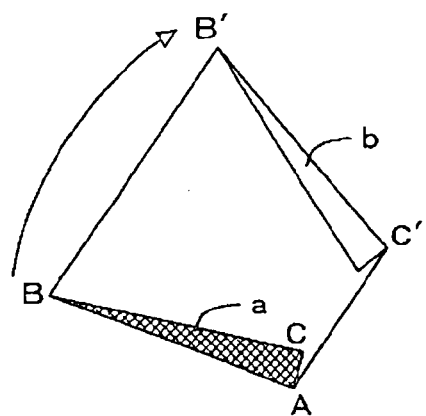
FIGS. 3A, 3B, and 3C are explanatory views for explaining a generation process of a motion blur pointer image in the meter for a vehicle.
Figure 3B:
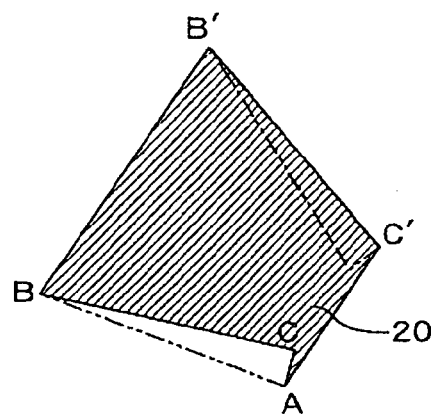
Figure 3C:
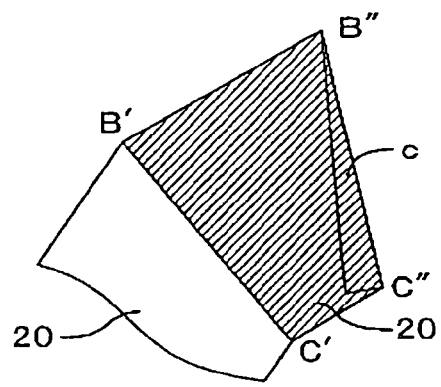

FIGS. 3A, 3B, and 3C are explanatory views for explaining a generation process of the motion blur pointer image in the meter for a vehicle. First, as shown in FIG. 3A, supposing that the rotation speed from a pointer "a" in the last frame to a pointer "b" in the present frame is more than the threshold value, and the pointer "a" is the normal pointer image. In this case, in the present frame, the motion blur pointer image is drawn instead of the pointer "b".

This motion blur pointer image is composed of a line AB defined by tips A, B of the pointer "a", a line C' B' defined by tips C', B' of the pointer "b", a line AC' and a line BB'. This trapezoid area ABB'C' is easily obtained with the coordinates of the tips A, B, B', C'. Next, as shown in FIG. 3B, a motion blur pointer image 20 composed of a concave pentagon ACBB'C' is obtained. This is the overlap avoiding process at step S11. Incidentally, the concave pentagon is calculated by subtracting a triangle area ABC as a drawing range of the pointer "a" from the trapezoid area ABB'C'. This subtraction is easily executed with a simple image processing.

Figure 5A:
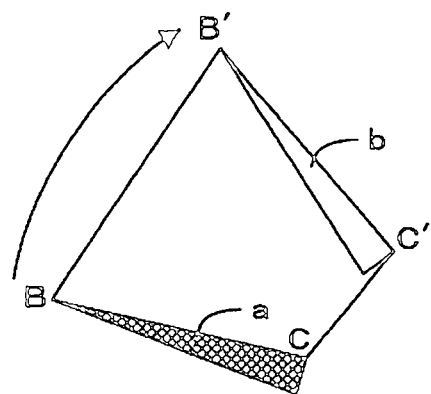
FIGS. 5A and 5B are another generation process of the motion blur pointer image in which an overlap avoiding process is simplified.
Figure 5B:
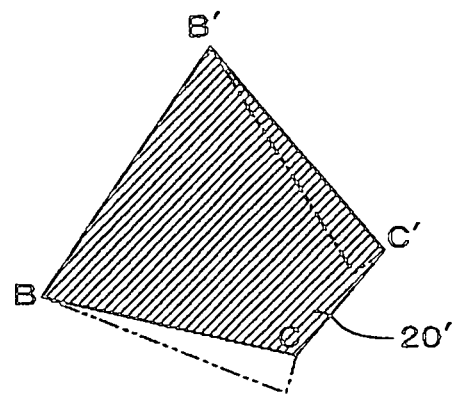
Figure 6A:
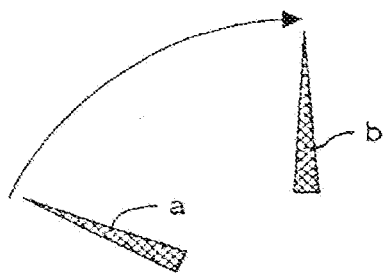
FIGS. 6A to 6D are explanatory views for explaining problems with the motion blur.
Figure 6B:
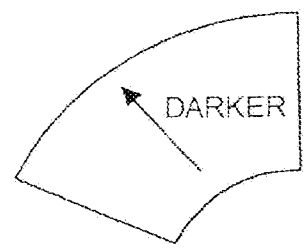
Figure 6C:
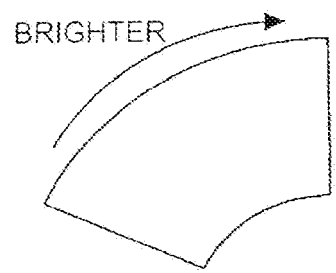
Figure 6D:
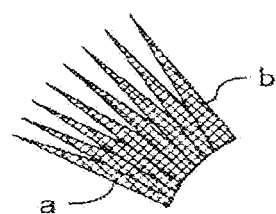

When the motion blur pointer image is displayed in both the last frame and the present frame, as shown in FIG. 3C, a trapezoid area C'B'B"C" as the motion blur pointer image 20 in the present frame is obtained from tips B', C' of the motion blur pointer image 20 in the last frame and tips C", B" of the motion blur pointer image 20 in the present frame. In this case, naturally, the overlap avoiding process is not needed. As shown in FIGS. 5A and 5B, the overlap avoiding process for the normal pointer image and the motion blur pointer image can be further simplified. Namely, as shown in FIG. 5A, a trapezoid CBB'C' composed of a line CB defined by tips C, B of the pointer "a", a line C'B' defined by tips C', B' of the pointer "b", a line CC', and a line BB' is obtained. The trapezoid CBB'C' corresponds to a motion blur pointer image 20' as shown in FIG. 5B.

Figure 4A:
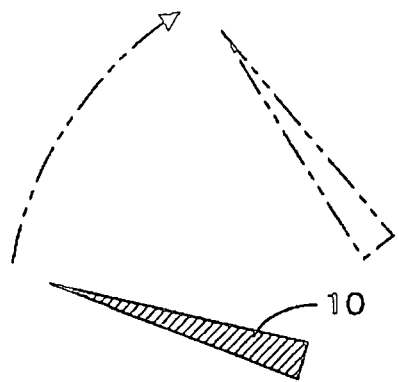
FIGS. 4A, 4B, and 4C are examples of displayed images in the meter for a vehicle.
Figure 4B:
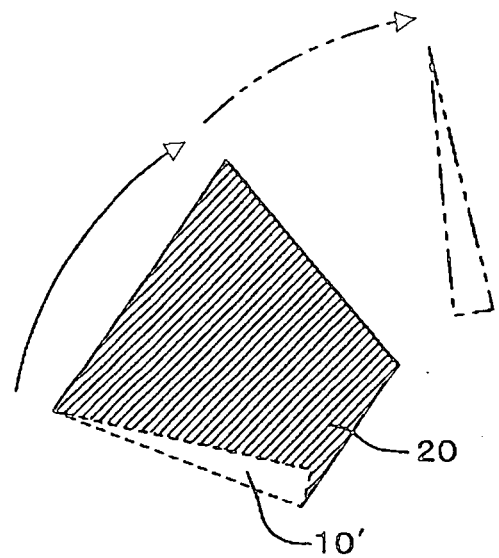
Figure 4C:
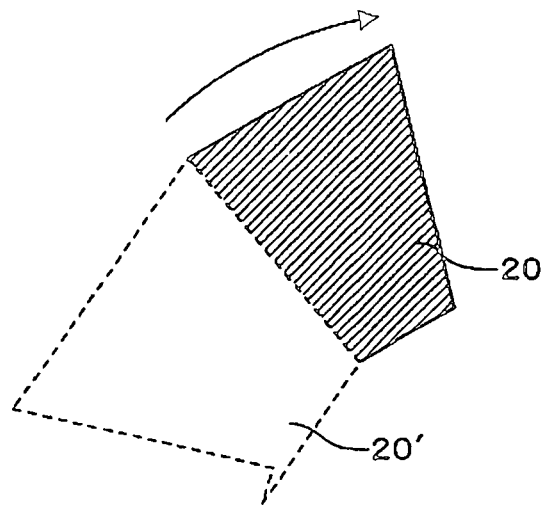

According to the above process, for example, displays shown in FIGS. 4A to 4C are displayed. FIG. 4A shows a normal pointer image 10. FIG. 4B shows the motion blur pointer image 20 in the present frame. In this case, when the motion blur pointer image 20 is drawn in the present frame, the image in the last frame is canceled and an afterimage 10' is bright. Brightness of this afterimage 10' is a little lower than that of the normal pointer image. The afterimage 10' and the motion blur pointer image 20 are simultaneously seen. However, because the afterimage 10' is not overlapped with the motion blur pointer image 20, uneven brightness caused by the overlapping is not occurred. FIG. 4C shows a state that the new motion blur pointer image 20 is drawn in the present frame and the afterimage 20' in the last frame remains.

Brightness L of the motion blur pointer image 20 is constant in one motion blur pointer image 20 in at least one frame. However, the brightness may be varied corresponding to the movement of the pointer in each frame.

For example, an area S of the motion blur pointer image 20 is substantially proportional to the rotation speed of the pointer. Therefore, the brightness L of the motion blur pointer image 20 is so determined that S * L is constant.

Namely, the area S has an inverted relationship with the brightness L (in this case, inverse proportion). Thus, when the rotation speed of the pointer is high, the brightness L is low. When the rotation speed is low, the brightness L is high. Thus, the movement of the pointer image looks like a movement of an analog pointer.

Further, inversely, when the rotation speed of the pointer is high, the brightness L may be high, and when the rotation speed is low, the brightness L may be low. According to such expressions, an acceleration of the pointer of the speedometer can be expressed by the amount of brightness.

In the above embodiment, whether switching the motion blur pointer image to the normal pointer image and whether switching the normal pointer image to the motion blur pointer image are judged by comparing the rotation speed with the threshold value. However, it is acceptable that two threshold values are used for the comparison and a hysteresis characteristic is added. In this case, a first threshold value is used for switching the motion blur pointer image to the normal pointer image, and the second threshold value is used for switching the normal pointer image to the motion blur pointer image.

In the above embodiment, the engine revolution indicator for a vehicle with the graphic meter display is explained. However, the speedometer also can use the graphic meter display.

In the above embodiment, an LCD is used as a graphic display device. However, an Organic EL display, a Plasma display, or the like can be used.

In the above embodiment, the graphic meter display is used for a vehicle meter. However, the graphic meter display may be used for other meters.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A graphic meter display for displaying a rotating pointer on a graphic display screen by updating a frame, from a last frame to a present frame, by drawing one of two images at a time on the graphic display screen every selected unit of time, comprising
    a motion blur pointer image, and
    a rotating pointer image, wherein
    when a pointer has a rotation speed and the rotation speed of the pointer to be displayed is more than a specific value, only the motion blur pointer image, composed of a trapezoid of which opposite sides are position coordinates of the pointer corresponding to the last frame and position coordinates of the pointer corresponding to the present frame, is drawn on the graphic display screen, and the graphic display screen displays the drawn motion blur pointer image as an image in the present frame, and
    when the pointer has a rotation speed and the rotation speed of the pointer to be displayed is less than or equal to the specific value, only the rotating pointer image is drawn on the graphic display screen, and the graphic display screen displays the drawn rotating pointer as an image in the present frame.

2. The display as claimed in claim 1, wherein the trapezoid of the motion blur pointer image is uniformly bright.

3. The display as claimed in claim 2, wherein brightness of the motion blur pointer image is changed depending on the rotation speed of the pointer.

4. The display as claimed in claim 3, wherein the brightness of the motion blur pointer image has an inverted relationship with an area of the motion blur pointer image.

5. The display as claimed in claim 3, wherein the brightness of the motion blur pointer image has a relationship with the rotation speed of the pointer.

6. The display as claimed in claim 1, wherein a drawing range of the motion blur pointer image in the present frame is not overlapped with the drawing range of the pointer image in the last frame.

* * * * *